United States Patent [19]
Kusyk et al.

[11] Patent Number: 5,920,258
[45] Date of Patent: Jul. 6, 1999

[54] ALARM SIGNAL PROCESSING CIRCUIT

[75] Inventors: Richard Glenn Kusyk, Kanata; Craig Donald Suitor, Nepean, both of Canada

[73] Assignee: Northern Telecom Limited, Montreal, Canada

[21] Appl. No.: 09/090,568

[22] Filed: Jun. 8, 1998

[51] Int. Cl.$^6$ .................................................. G08B 29/00
[52] U.S. Cl. .................. 340/506; 340/511; 340/825.06; 395/750; 395/735; 395/733
[58] Field of Search ..................... 340/506, 511, 340/517, 825.06, 825.15; 365/750, 733, 735

[56] References Cited

U.S. PATENT DOCUMENTS

| | | | |
|---|---|---|---|
| 5,551,044 | 8/1996 | Shah et al. | 395/750 |
| 5,617,429 | 4/1997 | Goto | 371/25.1 |
| 5,684,997 | 11/1997 | Kau et al. | 395/733 |

FOREIGN PATENT DOCUMENTS

| | | |
|---|---|---|
| 1225160 | 8/1987 | Canada . |
| 2093932 | 5/1992 | Canada . |
| 1319441 | 6/1993 | Canada . |
| 2137507 | 6/1995 | Canada . |
| 2011388 | 9/1996 | Canada . |

*Primary Examiner*—Daniel J. Wu
*Assistant Examiner*—Daryl C. Pope
*Attorney, Agent, or Firm*—Gowling, Strathy & Henderson; T. Gary O'Neill; Ikuko Wada

[57] ABSTRACT

An alarm signal processing circuit is provided for an integrated circuit having alarm signal generating circuitry for generating alarm signals having active and inactive states, and for connecting to a microprocessor. An alarm signal is stored in an alarm register which stores an inactive alarm signal until receipt of an active alarm signal, whereupon it stores the active alarm signal until receipt of an alarm register reset signal from the microprocessor. The alarm signal is also detected by an alarm detector which generates an event signal which is active when the alarm signal changes its status. An event register stores an inactive event signal until receipt of an active event signal, whereupon it stores the active event signal until receipt of an event register reset signal from the microprocessor. The event register outputs an event interrupt signal which is active when the stored event signal is active. The event interrupt signal is output by an event interrupt output means for use by the microprocessor. The event interrupt output means is controlled by an event enable register which stores an event enabling signal or an event disabling signal in response to an event enable control signal received from the microprocessor. The event interrupt output means is enabled to output an active event interrupt signal when the event enable register stores the event enabling signal, and disabled from outputting the active event interrupt signal when the event enable register stores the event disabling signal. The alarm register and the event register are accessible by the microprocessor to read the stored alarm signal or the stored event signal.

40 Claims, 5 Drawing Sheets

‖ Software read
↓ Software write '0'
↑ Software write '1'

│ Software read
↓ Software write '0'
↑ Software write '1'

ALARM SIGNAL PROCESSING CIRCUIT

This invention relates to an alarm signal processing circuit for an integrated circuit, and more particularly, the alarm signal processing circuit receiving alarm signals issued by an integrated circuit and produces an interrupt signal to a microprocessor.

BACKGROUND OF THE INVENTION

Integrated circuits, such as application specific integrated circuits (ASICs), are often provided with mechanisms for gathering alarms by a microprocessor connected to the ICs. It is common that an IC is provided with circuitry which monitors alarm points in the IC and generates alarm signals when a predetermined condition exists at an alarm point. A microprocessor connected to the IC performs appropriate processing in response to the alarm signals.

Differences in real-time behaviour of alarm points in an IC requires different firmware algorithms for a microprocessor to detect alarm signals and validate monitored alarm points. Some alarm points require interrupt-based algorithms and some require poll-based algorithms. These requirements are based on the characteristics of each alarm point and the corresponding effects on a system in which the IC is used.

The characteristics of each alarm point are not easily identified until the system has been integrated. Especially for an ASIC, such characteristics may not be well understood when the ASIC is being designed. Thus, it is difficult to determine the best firmware algorithm for a given alarm point prior to having working hardware in the system. If the alarm generating mechanism designed in a specific IC does not work well with the characteristics of the alarm points after integrating the IC in the system, a recycle of the IC may be required.

Canadian patent application No. 2,137,507 published on Jun. 10, 1995 discloses an interrupt controller for an ASIC having a number of system modules. One of the modules is an interrupt controller which can receive a number of interrupt signals. Each signal is programmably enabled pursuant to writing data to the respective interrupt registers, assigned a priority, and grouped into one of priority groupings. However, it does not address the problems between different algorithms used by the system to gather alarm signals.

It is therefore desirable to have a flexible alarm interface that can be implemented on an IC and can be used by firmware to implement different algorithms, such as interrupt-based and poll-based algorithms or a combination of these algorithms, for detection and validation of alarm points in the IC.

SUMMARY OF THE INVENTION

An object of the present invention is to provide an alarm signal processing circuit for an IC which provides a flexible alarm interface between the IC and a microprocessor connected to the IC.

To this end, the present invention uses special registers in an alarm signal processing circuit by which a microprocessor connected thereto can configure the circuit and read appropriate registers so that the microprocessor can use an interrupt-based algorithm or a poll-based algorithm or combination as desired. This flexibility in configuration by the microprocessor allows use of the same alarm signal processing circuit for each alarm point in the IC.

In accordance with an aspect of the present invention, there is provided an alarm signal processing circuit for an integrated circuit having alarm signal generating circuitry for generating alarm signals which have active and inactive states. The alarm signal processing circuit is connectable to a microprocessor. In the alarm signal processing circuit, an alarm signal generated by the alarm signal generating circuitry of the integrated circuit is stored in an alarm register. The alarm register stores an inactive alarm signal until receipt of an active alarm signal, whereupon it stores the active alarm signal until receipt of an alarm register reset signal from the microprocessor. The alarm register is accessible by the microprocessor to read the stored alarm signal. The alarm signal is also detected by an alarm detector which generates an event signal which is active when the alarm signal changes its status. The event signal is stored in an event register which stores an inactive event signal until receipt of an active event signal, whereupon it stores the active event signal until receipt of an event register reset signal from the microprocessor. The event register outputs an event interrupt signal which is active when the stored event signal is active. The event register is also accessible by the microprocessor to read the stored event signal. The event interrupt signal is output by an event interrupt output means for use by the microprocessor. The event interrupt output means is controlled by an event enable register which stores an event enabling signal or an event disabling signal in response to an event enable control signal received from the microprocessor. The event interrupt output means is enabled to output an active event interrupt signal when the event enable register stores the event enabling signal, and disabled from outputting the active event interrupt signal when the event enable register stores the event disabling signal.

BRIEF DESCRIPTION OF THE DRAWINGS

The invention will be further understood from the following description with reference to the drawings in which.

DETAILED DESCRIPTION OF THE PREFERRED EMBODIMENTS

Figure 1:
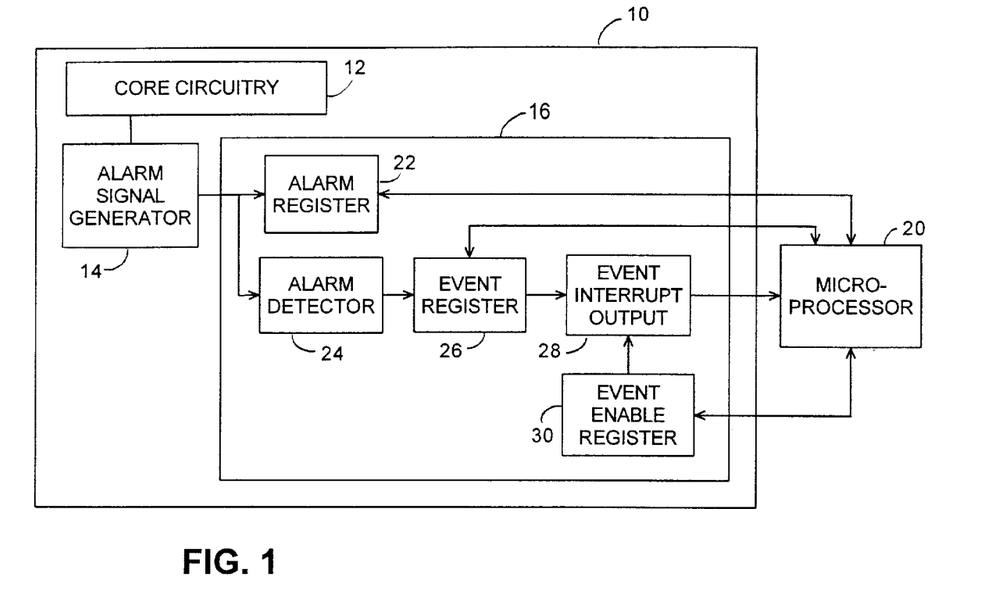
FIG. 1 is a block diagram showing a microprocessor and an integrated circuit in which an embodiment of the present invention is implemented.

Referring to FIG. 1, an embodiment of the present invention is integrated in an IC 10 having core logic circuitry 12 for performing a specific task for which the IC is designed, and alarm signal generating circuitry 14 for generating alarm signals which have active and inactive states. The core logic circuitry has an alarm point, and the alarm signal generating circuitry 14 monitors the alarm point and generates an active alarm signal when a specified condition exists at the alarm point or the status of the alarm point changes.

An alarm signal processing circuit 16 is provided in the IC 10 to process the alarm signal for use by a microprocessor 20 connected thereto.

In the alarm signal processing circuit 16, the alarm signal is received by an alarm register 22 and an alarm detector 24. The alarm register 22 stores an inactive alarm signal until receipt of an active alarm signal, whereupon it stores the active alarm signal until receipt of an alarm register reset signal from the microprocessor 20. The alarm detector 24 detects the alarm signal and generates an event signal which is active when the alarm signal changes its status. The active event signal indicates that the alarm signal has changed status.

The event signal generated by the alarm detector 24 is input to an event register 26 which stores an inactive event signal until receipt of an active event signal, whereupon it stores the active event signal until receipt of an event register reset signal from the microprocessor 20. The event register 26 outputs an event interrupt signal which is active when the stored event signal is active.

The event interrupt signal is then input to an event interrupt output means 28, which is connected to the microprocessor 20.

The event interrupt output means 28 is controlled by an event enable register 30 which stores an event enabling signal or an event disabling signal in response to an event enable control signal received from the microprocessor 20. When the event enable register 30 stores the event enabling signal, the event interrupt output means 28 is enabled to output the active event interrupt signal and outputs the event interrupt signal as received. The active interrupt signal is used by the microprocessor to initiate interrupt processing. When the event enable register 30 stores the event disabling signal, the event interrupt output means 28 is disabled from outputting any active event interrupt signal and the output of the event interrupt output means 28 remains inactive.

The alarm register 22 and the event register 26 are accessible by the microprocessor 20, so that the microprocessor may read the stored values in registers 22 and 26 regardless of whether the event interrupt output means 28 is enabled to output or disabled from outputting the active event interrupt signal.

Thus, the microprocessor 20 may perform appropriate processing in response to the event interrupt signal output from the event interrupt output means 28, or in response to the result of a poll of the alarm register 22 or the event register 26. Accordingly, the IC having the alarm signal processing circuit 16 may be used for an interrupt-based algorithm and/or a poll-based algorithm.

As described above, the alarm register 22 is reset by the alarm register reset signal received from the microprocessor 20. The alarm register reset signal resets the register 22 only when the alarm signal input in the register 22 is inactive. During the period when the alarm signal is active, the alarm register 22 is not reset by the alarm register reset signal, so that the active alarm signal is stored in the register 22.

The active event signal generated by the alarm detector 24 is a pulse signal. The duration of the pulse is preferably shorter than a microprocessor read or write cycle, so that the microprocessor can perform real time reading of the stored event signal in the event register 26. The duration of the pulse is long enough to set the event register 26 active.

Similar to the alarm register 22, the event register 26 is reset by the event register reset signal received from the microprocessor 20. The event register reset signal resets the register 26 only when the event signal received by the register 26 is inactive. Because the event signal is a pulse generated when the alarm signal changes its status, the event register 26 can be reset independently of the state of the alarm signal.

Figure 2:
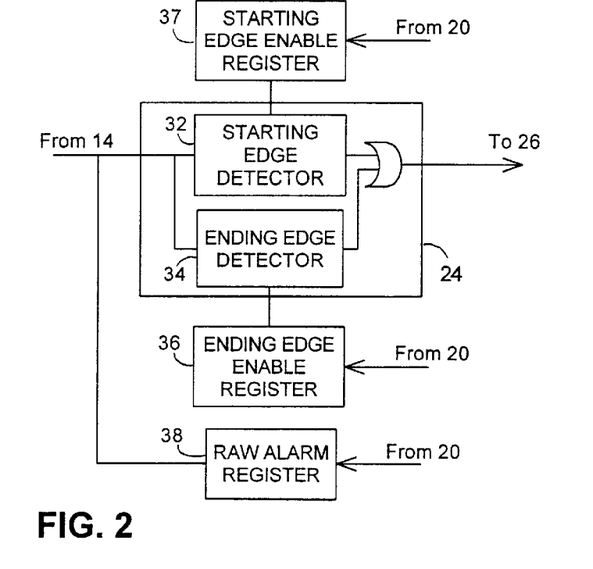
FIG. 2 is a block diagram showing preferred elements used in the alarm signal processing circuit shown in FIG. 2.

As shown in FIG. 2, in order to detect both starting and ending edges of the active alarm signal, the alarm detector 24 may comprise a starting edge detector 32 and an ending edge detector 34. In this case, the event register 26 stores the active event signal every time a starting edge or an ending edge of the active alarm signal is detected.

The ending edge detector 34 may be enabled to output or disabled from outputting an active event signal depending on the value stored in an ending edge enable register 36. The ending edge enable register 36 stores an enabling signal or a disabling signal in response to an ending edge control signal received from the microprocessor 20. When the ending edge enable register 36 stores the enabling signal, the ending edge detector 34 is enabled to output both an active event signal and inactive event signal in accordance with the detection results. When the ending edge enable register 36 stores the disabling signal, the ending edge detector 34 is disabled from outputting any active event signal and the output of the ending edge detector 34 remains inactive.

When the ending edge detector is enabled, the event signal indicates that the alarm signal changed the state from inactive to active or from active to inactive. If the ending edge detector is disabled, the event signal indicates that the alarm signal changed the state from inactive to active.

Thus, the microprocessor 20 may control the detection of the alarm signal at the starting edge only or at both the starting and ending edges of the active alarm signal.

A starting edge enable register 37 may also be provided to control the starting edge detector 32. Similar to the ending edge enable register 36, the starting edge enable register 37 stores an enabling signal or a disabling signal in response to a starting edge control signal received from the microprocessor 20. When the starting edge enable register 37 stores the enabling signal, the starting edge detector 32 is enabled to output both an active event signal and inactive event signal in accordance with the detection results. When the starting edge enable register 37 stores the disabling signal, the starting edge detector 32 is disabled from outputting any active event signal and the output of the starting edge detector 32 remains inactive.

Providing both the ending edge enable register 36 and the starting edge enable register 37 allows the microprocessor 20 to control the detection of the starting and ending edges of the active alarm signal independently. Thus, the microprocessor may use different algorithms for detecting the starting and ending edges of the active alarm signal.

It is preferable that the alarm signal processing circuit 16 further has a raw alarm register 38 which stores the alarm signal as it is received. When the alarm signal becomes active to inactive, the value of the raw alarm register 38 also becomes active to inactive. The raw alarm register 38 is also accessible by the microprocessor 20. Thus, the microprocessor may monitor the state of the alarm signal as generated by the alarm signal generating circuitry 14.

The alarm signal may be an alarm status signal which becomes active when a specified condition exists and becomes inactive when the condition ceases to exist. For example, a loss of clock alarm signal would be active when the clock has failed.

The alarm status signal is preferably stable when the condition exists. If an output of a detector in the alarm signal generating circuitry 14 randomly changes from active to inactive when the specified condition exists, it is preferable to provide in the IC an internal debouncing mechanism so as to generate a stable active alarm signal. For example, the output of input parity detectors are typically inactive when there are no parity errors, but when there are parity errors, the detector generates a random series of '1's and '0's. It is preferable to debounce the output of the detector before it is used as an active alarm signal to the alarm signal processing circuit 16.

The alarm signal may also be a pulse having a short active duration which indicates that something has changed or happened at an alarm point. For example, this type of alarm signal is generated when there is a one second tick or an indication that the status of a monitored alarm point has changed.

When the pulse has a duration shorter than the microprocessor read or write cycle but long enough to set the event register 26 active, the alarm signal may be input directly to the event register 26.

Generally, an IC is provided with a plurality of alarm points and the alarm signal generating circuitry monitors them. Because of the flexibility in configuration, the same alarm signal processing circuit may be used for every alarm point. It is preferable to group similar alarm signals and provide a hierarchal structure in the alarm signal processing circuit, so as to simplify the identification of the interrupt source when an interrupt is asserted.

Figure 3:
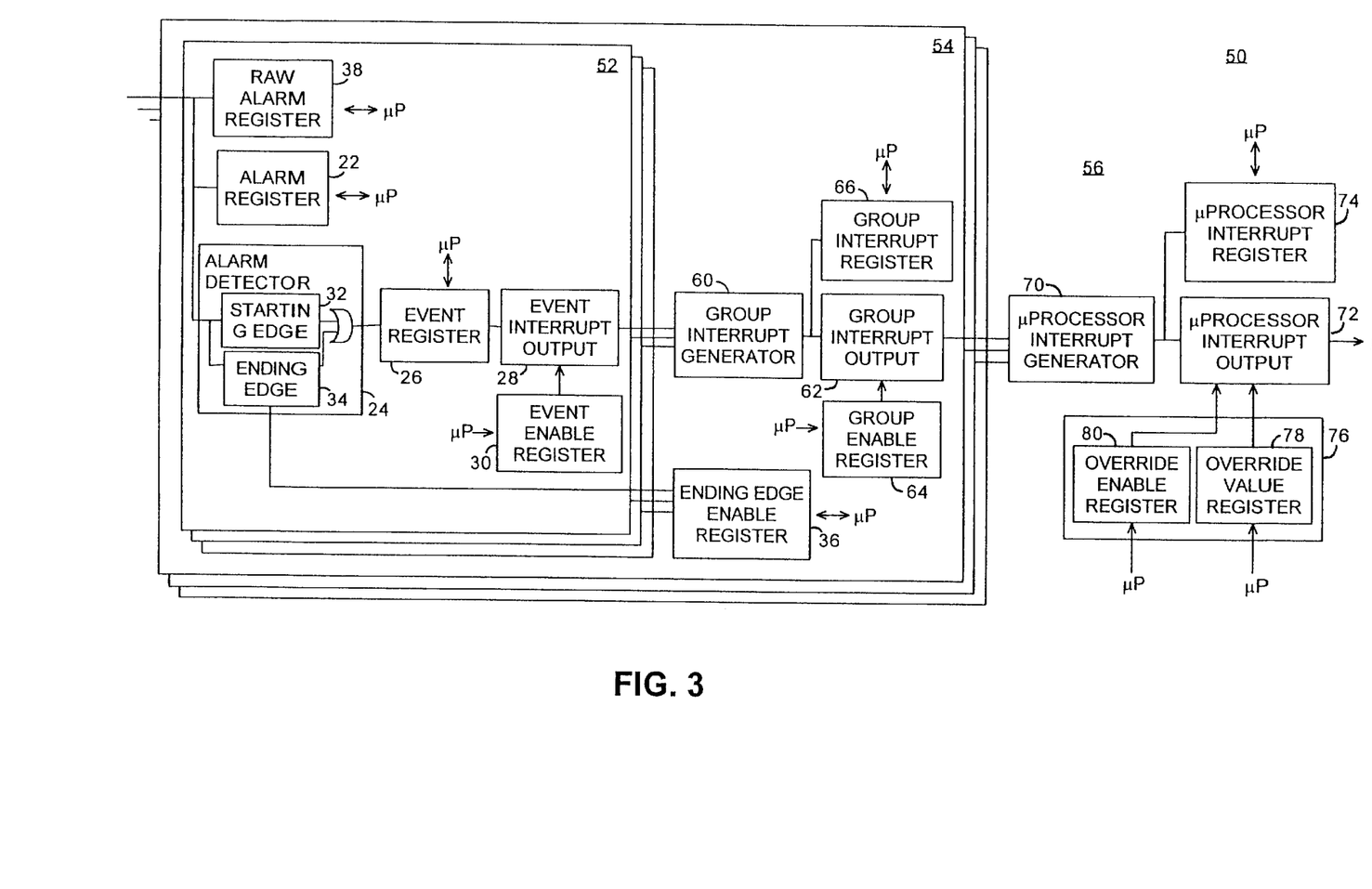
FIG. 3 is a block diagram showing another embodiment of the present invention.

FIG. 3 shows an embodiment of an alarm signal processing circuit 50 having a hierarchal structure. The alarm signal processing circuit 50 comprises a microprocessor interrupt subcircuit 56 which includes a plurality of alarm group subcircuits 54, each of which includes a plurality of alarm event subcircuits 52. The number of layers of hierarchy or the number of subcircuits grouped in each group may vary as desired. It is preferable to group alarm event subcircuits receiving similar alarm signals. For example, all IC input check activity monitors, or all serial data parity monitors may be grouped together.

Each alarm signal generated by the alarm signal generating circuitry is input to each alarm event subcircuit 52. Each alarm event subcircuit 52 comprises the elements described above referring to FIGS. 1 and 2 and the same elements are denoted by the same reference numerals.

The event interrupt signal output from the event interrupt output means 28 of each alarm event subcircuit 52 is input to a group interrupt generator 60 of its respective alarm group subcircuit 54. The group interrupt generator 60 generates a group interrupt signal which is active when any one of the alarm event subcircuits 52 of the group outputs an active event interrupt signal. The group interrupt signal is input to a group interrupt output means 62.

The group interrupt output means 62 is controlled by a group enable register 64 which stores a group enabling signal or a group disabling signal in response to a group enable control signal received from the microprocessor 20. When the group enable register 64 stores the group enabling signal, the group interrupt output means 62 is enabled to output the active group interrupt signal and outputs the group interrupt signal as received. When the group enable register 64 stores the group disabling signal, the group interrupt output means 62 is disabled from outputting any active group interrupt signal and the output of the group interrupt output means 62 remains inactive.

Each alarm group subcircuit may also include a group interrupt register 66 which stores the group interrupt signal as it is received. When the group interrupt signal becomes active to inactive, the value of the group interrupt register 66 also becomes active to inactive. The group interrupt register 66 is also accessible by the microprocessor 20. Thus, the microprocessor may monitor the state of each alarm group interrupt signal.

The ending edge enable register 36 may be provided in the alarm group subcircuit 54 to control all ending edge detectors 34 of the alarm event subcircuits 52 included in the group.

Similarly, a starting edge enable register (not shown) may also be provided in the alarm group subcircuit 54 to control all starting edge detectors 32 of the alarm event subcircuits 52 included in the group.

The group interrupt signal output from the group interrupt output means 62 of each alarm group subcircuit 54 is input to a microprocessor interrupt generator 70 of the microprocessor interrupt subcircuit 56. The microprocessor interrupt generator 70 generates a microprocessor interrupt signal which is active when any one of the alarm group subcircuits 54 outputs an active group signal. The microprocessor interrupt signal is input to a microprocessor interrupt output means 72 which is connected to the microprocessor 20. Thus, the microprocessor may use the microprocessor interrupt signal to initiate interrupt processing.

The microprocessor interrupt subcircuit may also include a microprocessor interrupt register 74 which stores the microprocessor interrupt signal as it is received. When the microprocessor interrupt signal becomes active to inactive, the value of the microprocessor interrupt register 74 also becomes active to inactive. The microprocessor interrupt register 74 is also accessible by the microprocessor 20. Thus, the microprocessor may monitor the state of the microprocessor interrupt signal prior to being input in the microprocessor.

As described above, the alarm signal processing circuit of the present invention is flexible because it is configurable by the microprocessor after the IC is integrated in a specific system. The microprocessor initially configures the event enable register 30, the ending edge enable register 36 and the group enable register 64 in accordance with predetermined configuration values of the registers in accordance with a program for processing the alarm signals stored in a memory (not shown), e.g. a flash memory. If the configuration is not appropriate for a specific alarm point or a different algorithm is to be used, the configuration of the registers may be easily modified by software changes executed by the microprocessor and it does not require any hardware changes.

Thus, an identical alarm signal processing circuit may be used for each of a plurality of alarm points, and each circuit may be configured by software in accordance with the behaviour of each alarm point in the system.

The alarm signal processing circuit 50 may be also provided with override circuitry 76 for overriding the microprocessor interrupt signal. The override circuitry 76 may comprise an override value register 78 for providing an override value to the microprocessor interrupt output means 72, and override enable register 80 for enabling or disabling the override value register to override the microprocessor interrupt signal in response to an override control signal received from the microprocessor 20.

The override circuitry provides the ability to test the integrity of the connection between the alarm signal processing circuit and the microprocessor without affecting the status and control of the alarm signal processing circuit or the other circuitry of the IC.

The alarm signal processing circuit of the present invention also provides the ability to check a persistency of an alarm point to determine whether the alarm point has remained persistently failed or persistently good for a given period of time without any transitions to the other state. For example, for alarms often the request is to assert a user indication after a defect has been persistent for 2.5 seconds and once asserted, clear the indication once the defect has disappeared for 10 seconds. Persistency in this case can be interpreted as 2.5 seconds or 10 seconds of where there is no transitions on the status of the defect.

A persistency check may be performed by reading the raw alarm register 38, resetting the event register 26, and after a given period of time, reading again the raw alarm register 38 and the event register 26. If the value of the raw alarm register 38 has not changed and the event register 26 remains reset, there is a persistency in the alarm point. The event interrupt output means may be disabled unless the interrupt handler is integrated into the persistency checking algorithm. The ending edge enable register can be set in either state.

EXAMPLE

Figure 4:
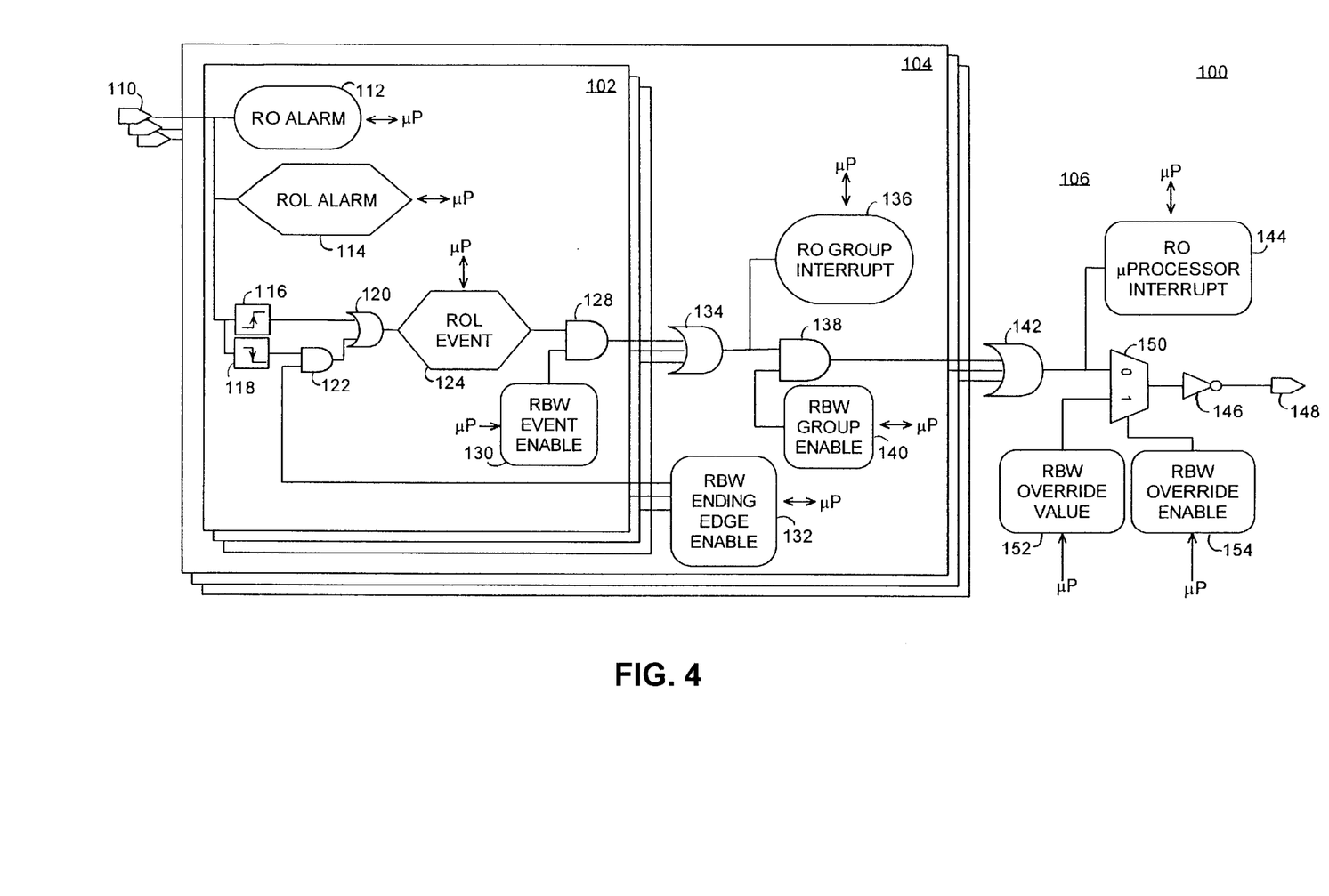
FIG. 4 is a block diagram showing an example of an alarm signal processing circuit for an application specific integrated circuit.

FIG. 4 shows an example of an alarm signal processing circuit 100.

The alarm signal processing circuit 100 comprises a hierarchal structure having a microprocessor interrupt subcircuit 106 which includes three alarm group subcircuits 104, each of which includes three alarm event subcircuits 102.

Each alarm signal generated from its respective internal alarm point in an ASIC (not shown) is input in each alarm event subcircuits 102 via an alarm input pin 110. The alarm signal is active high when a predetermined condition exists at the alarm point or the status of the alarm point changes.

Examples of alarm signals received from existing SONET (Synchronous Optical Network) ASICs are line defect alarms such as Loss of Signal (LOS) and Loss of Frame (LOF). When the output of a parity detector is used, it is debounced before being input to the alarm signal processing circuit 100, as described above.

Pulse signals may also be input as alarm signals. Examples of pulse signals are one second ticks, and interrupt on change types of events. For example, if a K-byte changes, a single pulse signal would be generated to identify the change to firmware.

The interrupt signal output from the alarm signal processing circuit 100 goes to an external pin which is connected to a microprocessor (not shown). The alarm signal processing circuit 100 asserts an active low interrupt signal for use by the microprocessor which has either an edge or edge/level sensitive interrupt input.

In each alarm event subcircuit 102, the input alarm signal is received by a Read-Only (RO) raw alarm register 112, a Read-Only Latched (ROL) alarm register 114, a rising edge detector 116 and a falling edge detector 118.

The RO raw alarm register 112 stores the alarm signal as it is received. The microprocessor can access this register 112 to read the stored raw alarm signal.

The ROL alarm register 114 retains any occurrence of a high state of the alarm signal until the register 114 is cleared or reset with a write action of a reset signal by the microprocessor through the software interface. The retained high state cannot be cleared until the reset signal is written while the alarm signal input state is low.

The rising edge detector 116 detects a rising edge of the high state of the alarm signal, and generates an event signal comprising a short pulse when the alarm signal goes from an inactive low state to an active high state. The falling edge detector 118 detects a falling edge of the high state of the alarm signal, and generates an event signal comprising a short pulse when the alarm signal goes from an active high state to an inactive low state. Each short pulse has a pulse duration which is shorter than a microprocessor read or write cycle but is long enough to set an ROL event register 124 high which is described later.

The output of the rising edge detector 116 is input in an OR gate 120, and the output of the falling edge detector 118 is input in the OR gate 120 via an AND gate 122. The AND gate also receives an output of a Read Back Write (RBW) falling edge enable register 132 which is a control register to select whether event signals are detected on rising edges or both rising and falling edges. The RBW falling edge enable register 132 is written and read by the microprocessor to output an active high enable signal or an inactive low disable signal. The ASIC does not modify the contents of the RBW falling edge enable register 132.

Thus, when the falling edge enable register 132 outputs an active high enable signal, the active event signal is output from the AND gate 122. The output of the OR gate 120 becomes high when either the rising edge detector or the falling edge detector 118 outputs an active high event signal.

The output of the OR gate 120 is input in the ROL event register 124 which indicates detection of a rising or falling edge of the alarm input signal until the ROL event register 124 is cleared or reset with a write action of a reset signal by the microprocessor through the software interface. Because the input signal of the ROL event register 124 is a short pulse output by either the raising edge detector or the falling edge detector, an active high state of the ROL event register can always be cleared independently of the state of the alarm signal and will be set active high when another edge of the alarm signal is detected.

The output of the ROL event register 124 is an event interrupt signal which is input in an AND gate 128. The AND gate 128 also receives an output of an RBW event enable register 130 which is a control register to select whether active event interrupt signals are enabled for use by the microprocessor. The RBW event enable register 130 is written and read by the microprocessor to output an active high enable signal or an inactive low disable signal. The ASIC does not modify the contents of the event enable register 130.

Thus, when the RBW event enable register 130 stores an active high enable signal, the active high event signals are output from the AND gate 128.

Three similar alarm event subcircuits 102 are grouped together. Each event interrupt output of the alarm event subcircuits is input in an OR gate 134 of its respective alarm group subcircuit 104 to generate a group interrupt signal. When any one of the alarm event subcircuits 102 outputs an active high event interrupt signal, the OR gate 134 outputs an active high group interrupt signal.

The group interrupt signal is input in an RO group interrupt register 136, by which the microprocessor can read the group interrupt signal.

The group interrupt signal is also input in an AND gate 138. The AND gate 138 also receives an output of an RBW group enable register 140 which is a control register to select whether each group is enabled to assert an active high group interrupt signal for use by the microprocessor. The RBW group enable register 140 functions in a similar manner to the RBW event enable register 130.

The RBW falling edge enable register 132 is provided in the alarm group subcircuit 104 to control all falling edge detectors of the alarm event subcircuits of the group.

Three alarm group subcircuits 104 are grouped together. Each group interrupt output of the alarm group subcircuits 104 is input in an OR gate 142 of the microprocessor interrupt subcircuit 106 to output a microprocessor interrupt signal. Thus, when any one of the alarm group subcircuits 104 outputs an active high group interrupt signal, the OR gate 142 outputs an active high microprocessor interrupt signal.

The microprocessor interrupt signal is input in an RO group interrupt register 144, by which the microprocessor may read the microprocessor interrupt signal.

The microprocessor interrupt signal is connected to an external pin 148 which is then connected to the microprocessor via an interrupt line (not shown). Since the microprocessor expects an active low interrupt signal, the microprocessor interrupt signal is inverted by an invertor 146 prior to being output from the pin 148.

Before the invertor 146, a multiplexer 150 is provided. The multiplexer 150 receives the microprocessor interrupt signal and outputs from an RBW override value register 152 and an RBW enable register 154. The RBW enable register 154 is a control register for overriding the microprocessor interrupt signal so as to test the physical connection between the alarm signal processing circuit 100 and the microprocessor. The RBW override value register 152 stores an override active value. Thus, the RBW override enable 154 outputs an enabling signal, the override active value overrides the microprocessor interrupt signal.

Figure 5:
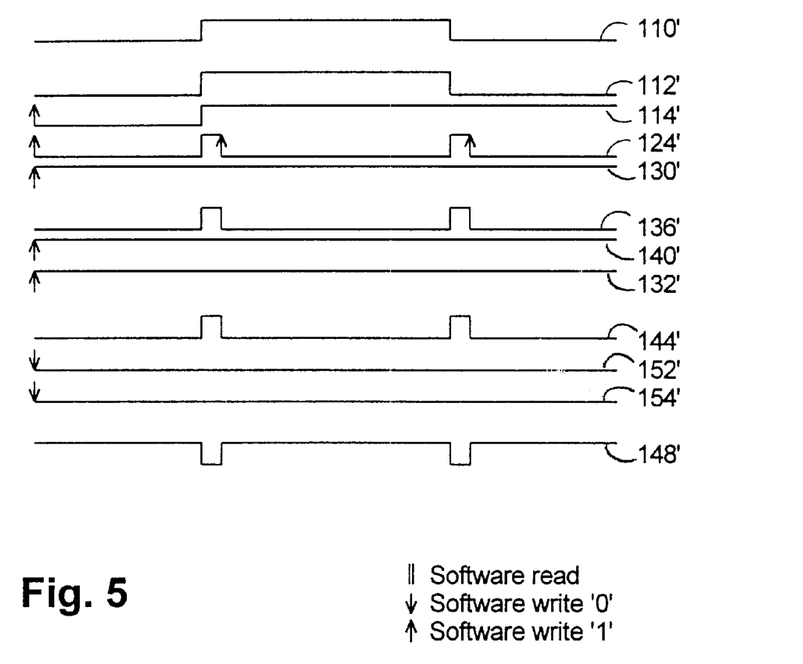
FIG. 5 is a chart showing the signal state in the alarm signal processing circuit shown in FIG. 4.

In order to operate the alarm interrupt processing circuit 100, the microprocessor may use a typical ASIC interrupt handler and a group interrupt handler as follows:

ASIC Interrupt handler:
    read group interrupt register
    IF [the microprocessor interrupt signal=0] test the interrupt line connected to the microprocessor [force to '0' and '1' while verifying at the microprocessor]
        IF the interrupt status test is successful raise a software error indication [interrupt invoked with no source]
        else
            disable the interrupt input at the microprocessor and fail the circuit pack
    ELSE [microprocessor interrupt signal=1] call group interrupt handler for all asserted and enabled alarm group subcircuits
Group Interrupt handler:
    read event register(s) for the appropriate group subcircuits FIG. 5 illustrates the controlling and signal state of the registers of the alarm signal processing circuit 100 when the microprocessor uses an interrupt-based algorithm for detecting the on and off states of an alarm.

Line 110' indicates a raw alarm signal as generated. The same signal is stored in the RO raw alarm register 112 (line 112').

In order to generate active microprocessor interrupt signals for turning an interrupt processing on and off, the RBW event enable register 130, the RBW group enable register 140 and the RBW falling edge enable register 132 are set high by a software write '1' by the microprocessor, as shown in lines 130', 140' and 132'. As no override is required, the RBW override value register 152 and the RBW override enable register 154 are set low by a software write '0', as shown in lines 152' and 154'.

As shown in line 114', the ROL alarm register 114 is initially reset by a software write '1' by the microprocessor. When the active alarm signal is received, the ROL alarm register 114 becomes high and the high state is retained even after the alarm signal becomes low until it is reset by the software write '1' by the microprocessor.

As shown in line 124', the ROL event register 124 is also initially reset by a software write '1' by the microprocessor. When the rising edge and the falling edge of the active alarm signal are detected, the ROL event register 124 becomes high. The high state is reset by a software write '1' by the microprocessor.

As the RBW event enable register 130 is set high, the RO group register 136 becomes high when the ROL event register 124 becomes high (line 136').

As the RBW group enable register 140 is set high, the RO microprocessor interrupt register 144 becomes high when the ROL group register 136 becomes high (line 144').

As shown in line 148', the interrupt signal at the output pin 148 becomes low when the RO interrupt register 144 becomes high at the rising edge and falling edge of the alarm signal. The microprocessor uses these active low interrupt signals to invoke interrupt processing of the associated alarm.

Figure 6:
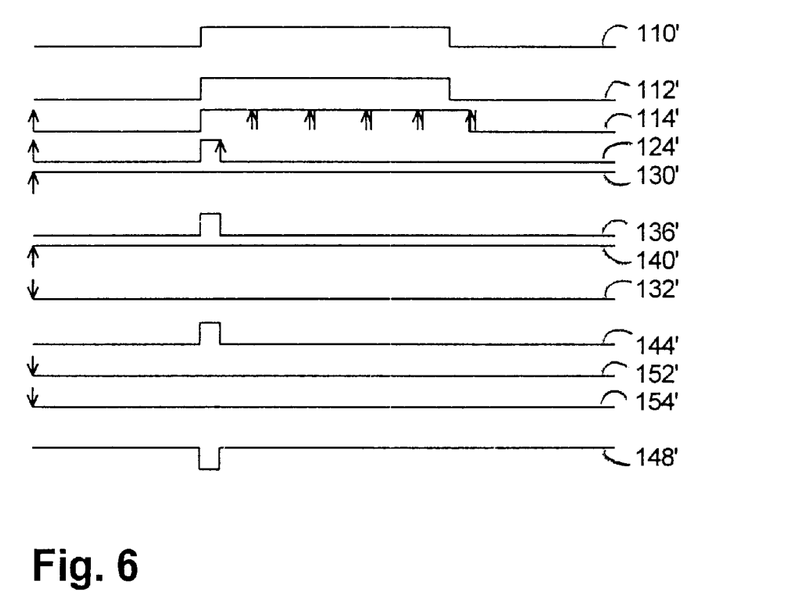
FIG. 6 is a chart showing the signal state in the alarm signal processing circuit shown in FIG. 4.

FIG. 6 illustrates the controlling and signal state of the registers of the alarm signal processing circuit 100 when the microprocessor uses an interrupt-based algorithm for turning on an interrupt processing, and a poll-based algorithm for turning off the interrupt processing.

Line 110' indicates a raw alarm signal as generated. The same signal is stored in the RO raw alarm register 112 (line 112').

In order to generate an active microprocessor interrupt signal to invoke interrupt processing, the RBW event enable register 130 and the RBW group enable register 140 are set high by a software write '1' by the microprocessor (lines 130' and 140'). However, in this case, the RBW falling edge enable register 132 is set low (line 132') to disable the falling edge detector 118.

As shown in line 114', the ROL alarm register 114 is initially reset by a software write '1' by the microprocessor. When the active alarm signal is received, the ROL alarm register 114 becomes high. The microprocessor starts polling in the ROL alarm register 114 by writing '1' and reading the value of the register 114. A software write '1' has no effect while the alarm signal is high. Thus, the ROL alarm register 114 remains high as long as the alarm signal is high. When the alarm signal becomes low, a write '1' resets the register 114.

As shown in line 124', the ROL event register 124 is also initially reset by a software write '1' by the microprocessor. When the rising edge of the active alarm signal is detected, the ROL event register 124 becomes high. The high state is reset by a software write '1' by the microprocessor. In this case, as the falling edge detector is disabled, the ROL event register 124 does not change its value at the falling edge of the alarm signal.

As the RBW event enable register 130 is set high, the RO group register 136 becomes high when the ROL event register 124 becomes high (line 136').

As the RBW group enable register 140 is set high, the RO microprocessor interrupt register 144 becomes high when the ROL group register 136 becomes high (line 144').

The interrupt signal at the output pin 148 becomes low when the RO interrupt register 144 becomes high at the rising edge of the alarm signal (line 148'). The microprocessor invokes interrupt processing by using this active low interrupt signal, and turns off the interrupt signal by resetting the ROL event register 124.

Figure 7:
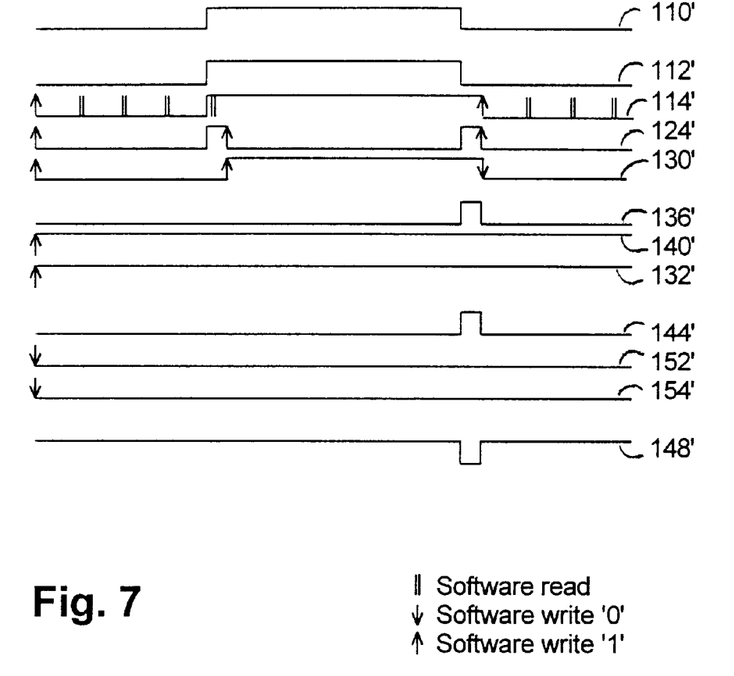
FIG. 7 is a chart showing the signal state in the alarm signal processing circuit shown in FIG. 4.

FIG. 7 illustrates the controlling and signal state of the registers of the alarm signal processing circuit 100 when the microprocessor uses a poll-based algorithm for turning on an interrupt processing, and an interrupt-based algorithm for turning off the interrupt processing.

Line 110' indicates a raw alarm signal as generated. The same signal is stored in the RO raw alarm register 112 (line 112').

In order to disable generation of an active microprocessor interrupt signal at the rising edge of the active alarm signal, the microprocessor sets the RBW event enable register 130 initially low by a software write '0', and then high by a software write '1' after the active alarm signal is detected by polling until an interrupt signal is generated at the falling edge of the active alarm signal (line 130'). Also, in order to generate an active interrupt signal for turning interrupt processing off, the RBW group enable register 140 and the RBW falling edge enable register 132 are set high by a software write '1' by the microprocessor (lines 140' and 132').

As shown in line 114', the ROL alarm register 114 is initially reset by a software write '1' by the microprocessor. It becomes high when the rising edge of the active alarm signal becomes active. The microprocessor polls in the ROL alarm register 114 by reading the value of the register until it detects the high state. The high state is retained until it is reset by a software write '1' after an microprocessor interrupt signal is generated at the falling edge of the active alarm signal.

As shown in line 124', the ROL event register 124 is also initially reset by a software write '1' by the microprocessor. Because the falling edge detector is enabled, when the rising edge and the falling edge of the active alarm signal are detected, the ROL event register 124 becomes high. The high state is reset by a software write '1' by the microprocessor.

As shown in line 136', at the rising edge of the alarm signal, the RO group register 136 remains low because the RBW event enable register 130 is set low. At the falling edge of the alarm signal, because the RBW event enable register 130 is set high, the RO group register 136 becomes high while the ROL event register 124 is high (line 136').

As the RBW group enable register 140 is set high, the RO microprocessor interrupt register 144 becomes high when the ROL group register 136 becomes high (line 144').

The interrupt signal at the output pin 148 becomes low when the RO interrupt register 144 becomes high at the falling edge of the alarm signal (line 148'). The microprocessor invokes interrupt processing as a result of a rising edge in the ROL event register 124 and terminates the interrupt signal by sending a resetting signal to the ROL event register 124.

Figure 8:
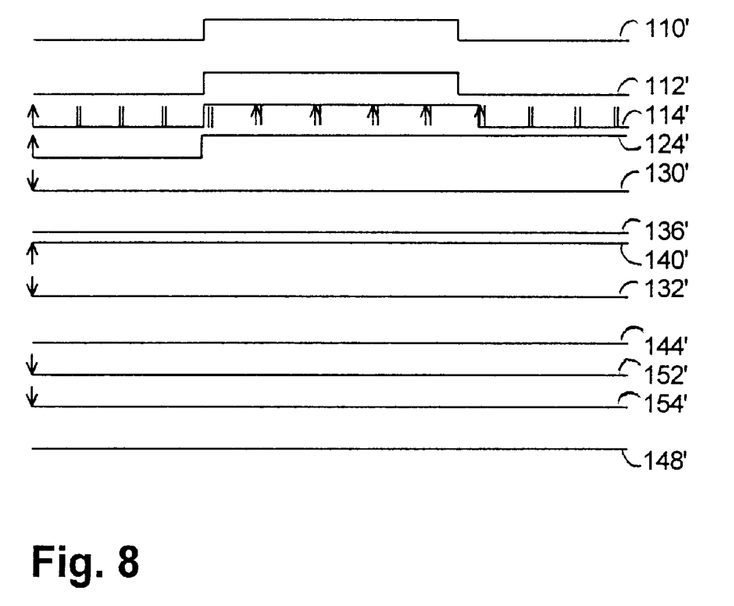
FIG. 8 is a chart showing the signal state in the alarm signal processing circuit shown in FIG. 4.

FIG. 8 illustrates the controlling and signal state of the registers of the alarm signal processing circuit 100 when the microprocessor uses a poll-based algorithm for detecting both turning on and off of an alarm signal.

Line 110' indicates a raw alarm signal as generated. The same signal is stored in the RO raw alarm register 112 (line 112').

In order to disable generation of an active microprocessor interrupt signal at both the rising edge and falling edge of the active alarm signal, the RBW event enable register 130 and the RBW falling edge enable register 132 are set low by a software write '0' by the microprocessor (lines 130' and 132').

As shown in line 114', the ROL alarm register 114 is initially reset by a software write '1' by the microprocessor. It becomes high when the rising edge of the alarm signal becomes high. The microprocessor polls in the ROL alarm register 114 by reading the value of the register to detect a change to a high state. After the change to a high state is detected, the microprocessor keeps polling in the ROL alarm register 114 by writing '1' and reading the value of the register to detect a change to a low state. A software write '1' has no effect while the alarm signal is high. Thus, the ROL alarm register 114 remains high as long as the alarm signal is high. When the alarm signal becomes low, a write '1' resets the register 114.

As shown in line 124', the ROL event register 124 is also initially reset by a software write '1' by the microprocessor. When the rising edge of the active alarm signal is detected, the ROL event register 124 becomes high. Because the falling edge detector is disabled, the ROL event register 124 does not change its value at the falling edge of the active alarm signal. The high state is retained until it is reset by a software write '1' by the microprocessor.

As shown in line 136', because the RBW event enable register 130 is set low, the RO group register 136 remains low.

The RO microprocessor interrupt register 144 remains low as the ROL group register 136 remains low (line 144').

As shown in line 148', no active low interrupt signal is generated at the output pin 148. The microprocessor uses the results of the poll of the ROL event register 124 to detect changes in the alarm state.

The present invention has been described referring to the drawings. It should be noted that the drawings are presented for illustrating preferred embodiments of the invention only, and the actual circuit may be designed differently to perform the same functions.

We claim:

1. An alarm signal processing circuit for an integrated circuit having alarm signal generating circuitry for generating alarm signals having active and inactive states, the alarm signal processing circuit being connectable to a microprocessor, the alarm signal processing circuit comprising:

an alarm register for storing an inactive alarm signal until receipt of an active alarm signal generated by the alarm signal generating circuitry of the integrated circuit, whereupon it stores the active alarm signal until receipt of an alarm register reset signal from the microprocessor, the alarm register being accessible by the microprocessor to read the stored alarm signal;

an alarm detector for detecting the alarm signal and generating an event signal which is active when the alarm signal changes its status;

an event register for storing an inactive event signal until receipt of an active event signal, whereupon it stores the active event signal until receipt of an event register reset signal from the microprocessor, and for outputting an event interrupt signal which is active when the stored event signal is active, the event register being accessible by the microprocessor to read the stored event signal;

an event interrupt output means for outputting the event interrupt signal for use by the microprocessor; and an event enable register for storing an event enabling signal or an event disabling signal in response to an event enable control signal received from the microprocessor so that the event interrupt output means is enabled to output an active event interrupt signal when the event enable register stores the event enabling signal, and disabled from outputting the active event interrupt signal when the event enable register stores the event disabling signal.

2. An alarm signal processing circuit as claimed in claim 1, wherein the event signal is a pulse having an active duration which is shorter than a microprocessor read or write cycle.

3. An alarm signal processing circuit as claimed in claim 2, wherein the alarm detector comprises a starting edge detector for detecting a starting edge of the active alarm signal, and an ending edge detector for detecting an ending edge of the active alarm signal.

4. An alarm signal processing circuit as claimed in claim 3, wherein the alarm signal processing circuit further comprises ending edge enable means for enabling or disabling the ending edge detector in response to an ending edge control signal received from the microprocessor.

5. An alarm signal processing circuit as claimed in claim 3, wherein the alarm signal processing circuit further comprises starting edge enable means for enabling or disabling the starting edge detector in response to a starting edge control signal received from the microprocessor.

6. An alarm signal processing circuit as claimed in claim 1, wherein the alarm signal processing circuit further comprises a raw alarm register for storing the alarm signal so that the stored raw alarm signal is active while the alarm signal is active and inactive while the alarm signal is inactive, the raw alarm register is accessible by the microprocessor to read the stored raw alarm signal.

7. An alarm signal processing circuit as claimed in claim 1, wherein the alarm signal processing circuit further comprises override means for overriding the event interrupt signal in response to an override control signal received from the microprocessor, so as to test the connection between the alarm signal processing circuit and the microprocessor.

8. An alarm signal processing circuit as claimed in claim 7, wherein the override means comprises:
   an override value register for providing an override value to the interrupt output; and
   override enable means for enabling or disabling the override value means in response to the override control signal.

9. An alarm signal processing circuit for an integrated circuit having alarm signal generating circuitry for generating alarm signals having active and inactive states, the alarm signal processing circuit being connectable to a microprocessor, the alarm signal processing circuit comprising:
   a plurality of alarm event subcircuits, each having:
      an alarm register for storing an inactive alarm signal until receipt of an active alarm signal generated by the alarm signal generating circuitry of the integrated circuit, whereupon it stores the active alarm signal until receipt of an alarm register reset signal from the microprocessor, the alarm register being accessible by the microprocessor to read the stored alarm signal;
      an alarm detector for detecting the alarm signal and generating an event signal which is active when the alarm signal changes its status;
      an event register for storing an inactive event signal until receipt of an active event signal, whereupon it stores the active event signal until receipt of an event register reset signal from the microprocessor, and for outputting an event interrupt signal which is active when the stored event signal is active, the event register being accessible by the microprocessor to read the stored event signal;
      an event interrupt output means for outputting the event interrupt signal for use by the microprocessor; and
      an event enable register for storing an event enabling signal or an event disabling signal in response to an event enable control signal received from the microprocessor so that the event interrupt output means is enabled to output an active event interrupt signal when the event enable register stores the event enabling signal, and disabled from outputting the active event interrupt signal when the event enable register stores the event disabling signal;
   a plurality of alarm group subcircuits, each having:
      group interrupt generating means for receiving event interrupt signals from a group of alarm event subcircuits, and generating a group interrupt signal which is active when any one of the alarm event subcircuits of the group outputs the active event interrupt signal;
      a group interrupt output means for outputting the group interrupt signal; and
      a group enable register for storing a group enabling signal or a group disabling signal in response to a group enable control signal received from the microprocessor so that the group interrupt output means is enabled to output an active group interrupt signal when the group enable register stores the group enabling signal, and disabled from outputting the active group interrupt signal when the group enable register stores the group disabling signal; and
   a microprocessor interrupt signal generating subcircuit comprising:
      microprocessor interrupt generating means for receiving group interrupt signals from the plurality of the alarm group subcircuits, and generating a microprocessor interrupt signal which is active when any one of the alarm group subcircuits outputs the active group interrupt signal; and
      a microprocessor interrupt output means for outputting the microprocessor interrupt signal to the microprocessor.

10. An alarm signal processing circuit as claimed in claim 9, wherein the event signal is a pulse having an active duration which is shorter than a microprocessor read or write cycle.

11. An alarm signal processing circuit as claimed in claim 10, wherein the alarm detector comprises a starting edge detector for detecting a starting edge of the active alarm signal, and an ending edge detector for detecting an ending edge of the active alarm signal.

12. An alarm signal processing circuit as claimed in claim 11, wherein the alarm signal processing circuit further comprises ending edge enable means for enabling or disabling the ending edge detector in response to an ending edge control signal received from the microprocessor.

13. An alarm signal processing circuit as claimed in claim 12, wherein the ending edge enable means is provided in each alarm group subcircuit for enabling or disabling the ending edge detector of each alarm event subcircuit included in the alarm group subcircuit.

14. An alarm signal processing circuit as claimed in claim 11, wherein the alarm signal processing circuit further comprises starting edge enable means for enabling or disabling the starting edge detector in response to a starting edge control signal received from the microprocessor.

15. An alarm signal processing circuit as claimed in claim 14, wherein the starting edge enable means is provided in each alarm group subcircuit for enabling or disabling the starting edge detector of each alarm event subcircuit included in the alarm group subcircuit.

16. An alarm signal processing circuit as claimed in claim 9, wherein each alarm event subcircuit further comprises a raw alarm register for storing the alarm signal so that the stored raw alarm signal is active while the alarm signal is active and inactive while the alarm signal is inactive, the raw alarm register is accessible by the microprocessor to read the stored raw alarm signal.

17. An alarm signal processing circuit as claimed in claim 9, wherein each alarm group subcircuit further comprises a group interrupt register for storing the group interrupt signal so that the stored group interrupt signal is active while the group interrupt signal is active and inactive while the group interrupt signal is inactive, the group interrupt register is accessible by the microprocessor to read the stored group interrupt signal.

18. An alarm signal processing circuit as claimed in claim 9, wherein the microprocessor interrupt generating subcircuit further comprises a microprocessor interrupt register for storing the microprocessor interrupt signal so that the stored microprocessor interrupt signal is active while the microprocessor interrupt signal is active and inactive while the microprocessor interrupt signal is inactive, the microprocessor interrupt register is accessible by the microprocessor to read the stored microprocessor interrupt signal.

19. An alarm signal processing circuit as claimed in claim 9, wherein the alarm signal processing circuit further comprises override means for overriding the microprocessor interrupt signal in response to an override control signal received from the microprocessor, so as to test the connection between the alarm signal processing circuit and the microprocessor.

20. An alarm signal processing circuit as claimed in claim 19, wherein the override means comprises:
an override value register for providing an override value to the microprocessor interrupt output means; and
override enable means for enabling or disabling the override value means in response to the override control signal.

21. An application specific integrated circuit (ASIC) which is connectable to a microprocessor, the ASIC comprising:
core logic circuitry for performing a specified task for which the ASIC is designed, the core logic circuitry having a plurality of alarm points;
alarm signal generating circuitry for monitoring each alarm point and generating an alarm signal which is active when the alarm point presents a predetermined condition;
an alarm signal processing circuit for processing alarm signals generated by the alarm signal generating circuitry, the alarm signal processing circuit having:
a plurality of alarm event subcircuits, each alarm event subcircuit being connected to the alarm signal generating circuitry to receive an alarm signal generated for a respective alarm point of the core logic circuitry, and each alarm event subcircuit having:
an alarm register for storing an inactive alarm signal until receipt of an active alarm signal generated by the alarm signal generating circuitry of the integrated circuit, whereupon it stores the active alarm signal until receipt of an alarm register reset signal from the microprocessor, the alarm register being accessible by the microprocessor to read the stored alarm signal;
an alarm detector for detecting the alarm signal and generating an event signal which is active when the alarm signal changes its status;
an event register for storing an inactive event signal until receipt of an active event signal, whereupon it stores the active event signal until receipt of an event register reset signal from the microprocessor, and for outputting an event interrupt signal which is active when the stored event signal is active, the event register being accessible by the microprocessor to read the stored event signal;
an event interrupt output means for outputting the event interrupt signal for use by the microprocessor; and
an event enable register for storing an event enabling signal or an event disabling signal in response to an event enable control signal received from the microprocessor so that the event interrupt output means is enabled to output an active event interrupt signal when the event enable register stores the event enabling signal, and disabled from outputting the active event interrupt signal when the event enable register stores the event disabling signal;
a plurality of alarm group subcircuits, each having:
group interrupt generating means for receiving event interrupt signals from a group of alarm event subcircuits, and generating a group interrupt signal which is active when any one of the alarm event subcircuits of the group outputs the active event interrupt signal;
a group interrupt output means for outputting the group interrupt signal; and
a group enable register for storing a group enabling signal or a group disabling signal in response to a group enable control signal received from the microprocessor so that the group interrupt output means is enabled to output an active group interrupt signal when the group enable register stores the group enabling signal, and disabled from outputting the active group interrupt signal when the group enable register stores the group disabling signal; and
a microprocessor interrupt signal generating subcircuit comprising:
microprocessor interrupt generating means for receiving group interrupt signals from the plurality of the alarm group subcircuits, and generating a microprocessor interrupt signal which is active when any one of the alarm group subcircuits outputs the active group interrupt signal; and
a microprocessor interrupt output means for outputting the microprocessor interrupt signal to the microprocessor.

22. An ASIC as claimed in claim 21, wherein the event signal is a pulse having an active duration which is shorter than a microprocessor read or write cycle.

23. An ASIC as claimed in claim 22, wherein the alarm detector comprises a starting edge detector for detecting a starting edge of the active alarm signal, and an ending edge detector for detecting an ending edge of the active alarm signal.

24. An ASIC as claimed in claim 23, wherein the alarm signal processing circuit further comprises ending edge enable means for enabling or disabling the ending edge detector in response to an ending edge control signal received from the microprocessor.

25. An ASIC as claimed in claim 24, wherein the ending edge enable means is provided in each alarm group subcircuit for enabling or disabling the ending edge detector of each alarm event subcircuit included in the alarm group subcircuit.

26. An ASIC as claimed in claim 23, wherein the alarm signal processing circuit further comprises starting edge enable means for enabling or disabling the starting edge detector in response to a starting edge control signal received from the microprocessor.

27. An ASIC as claimed in claim 26, wherein the starting edge enable means is provided in each alarm group subcircuit for enabling or disabling the starting edge detector of each alarm event subcircuit included in the alarm group subcircuit.

28. An ASIC as claimed in claim 21, wherein each alarm event subcircuit further comprises a raw alarm register for storing the alarm signal so that the stored raw alarm signal is active while the alarm signal is active and inactive while the alarm signal is inactive, the raw alarm register is accessible by the microprocessor to read the stored raw alarm signal.

29. An ASIC as claimed in claim 21, wherein each alarm group subcircuit further comprises a group interrupt register for storing the group interrupt signal so that the stored group interrupt signal is active while the group interrupt signal is active and inactive while the group interrupt signal is inactive, the group interrupt register is accessible by the microprocessor to read the stored group interrupt signal.

30. An ASIC as claimed in claim 21, wherein the microprocessor interrupt generating subcircuit further comprises a microprocessor interrupt register for storing the microprocessor interrupt signal so that the stored microprocessor interrupt signal is active while the microprocessor interrupt signal is active and inactive while the microprocessor interrupt signal is inactive, the microprocessor interrupt register is accessible by the microprocessor to read the stored microprocessor interrupt signal.

31. An ASIC as claimed in claim 21, wherein the alarm signal processing circuit further comprises override means for overriding the microprocessor interrupt signal in response to an override control signal received from the microprocessor, so as to test the connection between the alarm signal processing circuit and the microprocessor.

32. An ASIC as claimed in claim 31, wherein the override means comprises:

an override value register for providing an override value to the microprocessor interrupt output means; and override enable means for enabling or disabling the override value means in response to the override control signal.

33. An alarm signal processing circuit for an integrated circuit having alarm signal generating circuitry for generating alarm signals having active and inactive states, the alarm signal processing circuit being connectable to a microprocessor, the alarm signal processing circuit comprising:

a plurality of alarm event subcircuits, each having:
   a raw alarm register for storing the alarm signal so that the stored raw alarm signal is active while the alarm signal is active and inactive while the alarm signal is inactive, the raw alarm register being accessible by the microprocessor to read the stored raw alarm signal;

an alarm register for storing an inactive alarm signal until receipt of an active alarm signal generated by the alarm signal generating circuitry of the integrated circuit, whereupon it stores the active alarm signal until receipt of an alarm register reset signal from the microprocessor, the alarm register being accessible by the microprocessor to read the stored alarm signal;

an alarm detector for detecting the alarm signal and generating an event signal which is active when the alarm signal changes its status, the event signal being a pulse having an active duration which is shorter than a microprocessor read or write cycle, the alarm detector comprising a starting edge detector for detecting a starting edge of the active alarm signal, and an ending edge detector for detecting an ending edge of the active alarm signal;

an event register for storing an inactive event signal until receipt of an active event signal, whereupon it stores the active event signal until receipt of an event register reset signal from the microprocessor, and for outputting an event interrupt signal which is active when the stored event signal is active, the event register being accessible by the microprocessor to read the stored event signal;

an event interrupt output means for outputting the event interrupt signal for use by the microprocessor; and an event enable register for storing an event enabling signal or an event disabling signal in response to an event enable control signal received from the microprocessor so that the event interrupt output means is enabled to output an active event interrupt signal when the event enable register stores the event enabling signal, and disabled from outputting the active event interrupt signal when the event enable register stores the event disabling signal;

a plurality of alarm group subcircuits, each having:
   group interrupt generating means for receiving event interrupt signals from a group of alarm event subcircuits, and generating a group interrupt signal which is active when any one of the alarm event subcircuits of the group outputs the active event interrupt signal;

a group interrupt register for storing the group interrupt signal so that the stored group interrupt signal is active while the group interrupt signal is active and inactive while the group interrupt signal is inactive, the group interrupt register being accessible by the microprocessor to read the stored group interrupt signal;

a group interrupt output means for outputting the group interrupt signal;

a group enable register for storing a group enabling signal or a group disabling signal in response to a group enable control signal received from the microprocessor so that the group interrupt output means is enabled to output an active group interrupt signal when the group enable register stores the group enabling signal, and disabled from outputting the active group interrupt signal when the group enable register stores the group disabling signal; and ending edge enable means for enabling or disabling the ending edge detector of each alarm event subcircuit included in the alarm group subcircuit in response to an ending edge control signal received from the microprocessor; and a microprocessor interrupt signal generating subcircuit comprising:

microprocessor interrupt generating means for receiving group interrupt signals from the plurality of the alarm group subcircuits, and generating a microprocessor interrupt signal which is active when any one of the alarm group subcircuits outputs the active group interrupt signal;

a microprocessor interrupt register for storing the microprocessor interrupt signal so that the stored microprocessor interrupt signal is active while the microprocessor interrupt signal is active and inactive while the microprocessor interrupt signal is inactive, the microprocessor interrupt register being accessible by the microprocessor to read the stored microprocessor interrupt signal;

a microprocessor interrupt output means for outputting the microprocessor interrupt signal to the microprocessor; and override means for overriding the microprocessor interrupt signal in response to an override control signal received from the microprocessor, so as to test the connection between the alarm signal processing circuit and the microprocessor, the override means comprising an override value register for providing an override value to the microprocessor interrupt output means, and override enable means for enabling or disabling the override value means in response to the override control signal.

34. A method for processing alarm signals generated by alarm generating circuitry which monitors alarm points of an integrated circuit, the alarm signals having active and inactive states; the method comprising the steps of:

providing an alarm signal processing circuit which is connectable to a microprocessor and has:

an alarm register for storing an inactive alarm signal until receipt of an active alarm signal generated by the alarm signal generating circuitry of the integrated circuit, whereupon it stores the active alarm signal until receipt of an alarm register reset signal from the microprocessor, the alarm register being accessible by the microprocessor to read the stored alarm signal;

an alarm detector for detecting the alarm signal and generating an event signal which is active when the alarm signal changes its status;

an event register for storing an inactive event signal until receipt of an active event signal, whereupon it stores the active event signal until receipt of an event register reset signal from the microprocessor, and for outputting an event interrupt signal which is active when the stored event signal is active, the event register being accessible by the microprocessor to read the stored event signal;

an event interrupt output means for outputting the event interrupt signal for use by the microprocessor; and an event enable register for storing an event enabling signal or an event disabling signal in response to an event enable control signal received from the microprocessor so that the event interrupt output means is enabled to output an active event interrupt signal when the event enable register stores the event enabling signal, and disabled from outputting the active event interrupt signal when the event enable register stores the event disabling signal configuring the event enable register by writing a predetermined event enable configuration value in the event enable register by the microprocessor; and modifying the predetermined event enable configuration value by the microprocessor in accordance with characteristics of the alarm points.

35. A method as claimed in claim 34, wherein the step of providing an alarm signal processing circuit comprises the step of providing the alarm detector with a starting edge detector for detecting a starting edge of the active alarm signal, and an ending edge detector for detecting an ending edge of the active alarm signal.

36. A method as claimed in claim 35, wherein the step of providing an alarm signal processing circuit comprises the step of providing the alarm signal processing circuit with ending edge enable means for enabling or disabling the ending edge detector in response to an ending edge control signal received from the microprocessor; and the method further comprises the steps of:
configuring the ending edge enable means by writing a predetermined ending edge configuration value by the microprocessor; and
modifying the predetermined ending edge configuration value by the microprocessor in accordance with characteristics of the alarm points.

37. A method as claimed in claim 35, wherein the step of providing an alarm signal processing circuit comprises the step of providing the alarm signal processing circuit with starting edge enable means for enabling or disabling the starting edge detector in response to a starting edge control signal received from the microprocessor; and the method further comprises the steps of:
configuring the starting edge enable means by writing a predetermined starting edge configuration value by the microprocessor; and
modifying the predetermined starting edge configuration value by the microprocessor in accordance with characteristics of the alarm points.

38. A method as claimed in claim 34, wherein the step of providing an alarm signal processing circuit comprises the step of providing the alarm signal processing circuit with a raw alarm register for storing the alarm signal so that the stored raw alarm signal is active while the alarm signal is active and inactive while the alarm signal is inactive, the raw alarm register is accessible by the microprocessor to read the stored raw alarm signal.

39. A method as claimed in claim 34, wherein the step of providing an alarm signal processing circuit comprises the step of providing the alarm signal processing circuit with override means for overriding the event interrupt signal in response to an override control signal received from the microprocessor, so as to test the connection between the alarm signal processing circuit and the microprocessor.

40. A method as claimed in claim 39, wherein the step of providing override means comprises the step of providing the override means with an override value register for providing an override value to the interrupt output, and override enable means for enabling or disabling the override value means in response to the override control signal; and the method further comprises the steps of:
configuring the override enable means by writing a predetermined override configuration value by the microprocessor; and
modifying the predetermined override configuration value by the microprocessor in accordance with characteristics of the alarm points.

* * * * *